United States Patent [19]

Wiech, Jr.

[11] Patent Number: 4,854,970

[45] Date of Patent: Aug. 8, 1989

[54] ART MEDIUM

[75] Inventor: Raymond E. Wiech, Jr., San Diego, Calif.

[73] Assignee: Fine Particle Technology, Inc., San Diego, Calif.

[21] Appl. No.: 870,744

[22] Filed: Jun. 4, 1986

[51] Int. Cl.[4] .................... C09D 1/00

[52] U.S. Cl. .................... 106/286.1; 106/286.8; 106/287.18

[58] Field of Search .................... 106/287.18; 75/235, 75/251, 252

[56] References Cited

U.S. PATENT DOCUMENTS

| | | | |
|---|---|---|---|
| 2,389,061 | 11/1945 | Kuzmick | 75/252 |
| 4,608,317 | 8/1986 | Kobayashi et al. | 75/252 |
| 4,721,599 | 1/1988 | Nakamura | 419/23 |

*Primary Examiner*—Josephine Barr
*Attorney, Agent, or Firm*—Jay M. Cantor

[57] ABSTRACT

The disclosure relates to an art medium which is readily moldable, has substantially the same feel as clay, can provide aesthetic exterior surfaces without additional processing steps, can be worked by standard metal working tools, such as drills, etc. and results in a metal end product. Briefly, the above is accomplished by homogeneously mixing together a powdered metal which is sinterable and a plasticizer. This composition is mixed together with a liquid, preferably water in sufficient quantity to provide the consistency desired by the user, the same as when operating with clay. Water is added during molding to replace that which evaporates to maintain the desired consistency. The powdered metal has an average particle size of form about 10 microns down to about 0.1 micron. The ratio by weight of powdered metal to plasticizer is from about 97% to about 91% powdered metal and from about 3% to about 9% plasticizer. A preferred ratio by weight is 95% powdered metal and 5% plasticizer. Any metal or combination of metals or prealloys which are available ion powdered from and are sinterable can be used. Nickel is a preferred metal due to the glossy non-rusting surface that can be obtained after sintering. A preferred plasticizer with water is bentonite. From about 5% to about 20% by weight of metal particles having diameter substantially larger than the powdered metal by at least about ten times can be used in place of some of the powdered metal to aid in binder extraction.

12 Claims, No Drawings

ART MEDIUM

BACKGROUND OF THE INVENTION

1. Field of the Invention

This invention relates to a medium from which art forms such as sculpture and the like can be formed and, more specifically, to an improved moldable art medium for forming art forms.

2. Brief description of the Prior Art

Three dimensional art forms, primarily sculpture, are produced from any one of several known media. In the area of moldable media, the principal medium used is clay, possibly with additives thereto. Other ceramic materials have also been used in the same manner as the well known clays to form works of art, pottery and the like. While these materials provide satisfactory results, it is necessary to perform complex processing steps to the surface thereof in order to form aesthetic works. In addition, the works are brittle and therefore easily broken and not easily worked mechanically. It is therefore apparent that a material having the molding properties of clay, yet requiring few or none of the processing steps of the prior art and which is not brittle would have great utility as an art medium. This is particularly true if the final product is formed of metal.

SUMMARY OF THE INVENTION

In accordance with the present invention, there is provided an art medium which is readily moldable, has substantially the same feel as clay, can provide aesthetic exterior surfaces without additional processing steps, can be worked by standard metal working tools, such as drills, etc. and results in a metal end product. Briefly, the above is accomplished by homogeneously mixing together a powdered metal which is sinterable and a plasticizer. This composition is mixed together with a liquid, preferably water in sufficient quantity to provide the consistency desired by the user, the same as when operating with clay. Water is added during molding to replace that which evaporates to maintain the desired consistency. The powdered metal has an average particle size of from about 10 microns down to about 0.1 micron. The ratio by weight of powdered metal to plasticizer is from about 97% to about 91% powdered metal and from about 3% to about 9% percent plasticizer. A preferred ratio by weight is 95% powdered metal and 5% plasticizer. Any metal or combination of metals or prealloys which are available in powdered form and are sinterable can be used. Nickel is a preferred metal due to the glossy non-rusting surface that can be obtained after sintering. A preferred plasticizer with water is bentonite. From about 5% to about 20% by weight of metal by at least about ten times can be used in place of some of the powdered metal to aid in binder extraction.

It has been found that superior results are obtained due to swelling of the plasticizer by adding water to the mixture of powdered metal and plasticizer and allowing the resultant product to stand for from about one week to about one month or even longer in an enclosed region such as, for example, a closed plastic bag, ensuring that the mixture remain moist at all times. Organics that support organic growth, such as sugar, flour, etc. and mixtures thereof can also be added to aid in lubricity and plasticity of the mix.

The above described material can now be shaped in the same manner as clay and, when the desired shape is obtained, the water is removed from the shape by evaporation by standing in an atmosphere wherein the water can evaporate. Heat can be added to increase the evaporation rate. When all or most of the water has evaporated, the shape is placed in a sintering furnace in a vacuum or reducing atmosphere, preferably comprising hydrogen and argon as is standard in the powdered metal sintering art and the temperature is increased to the sintering temperature for the material involved. In the case of nickel, this will be usually greater than 1100 degrees C. and less than 1400 degrees C. The temperature in the furnace is then decreased to about 80 degrees C. at which point the argon and hydrogen in the furnace are replaced by ambient air and the part is removed from the furnace.

DESCRIPTION OF THE PREFERRED EMBODIMENT

In order to provide the desired mixture for molding an art form, 950 grams of powdered nickel having an average particle size of about 4 microns with a range of about 2 to 7 microns was provided. The nickel was mixed in a standard laboratory mixer with 50 grams of bentonite for one hour. A handful of this mixture was then placed in a dish and mixed with water until the consistency of the mixture was about that of standard clay. The mixture was then molded by hand into a shape and lines and grooves were formed therein using conventional wood ceramic working tools to form the lines and grooves. The molded shape was then placed on a shelf at room temperature for 4 days to drive out the water which was acting as a binder. The molded shape with water removed was then placed in a furnace, the furnace was purged of ambient air by passing argon therethrough for five minutes and hydrogen was then added to the atmosphere in the furnace to provide about 80% argon and 20% hydrogen. The temperature was then raised from ambient to 150 degrees C. at ten degrees C. per hour and then to 1250 degrees C. as quickly as possible and held at that temperature for one hour to permit the nickel particles to sinter into each other. The furnace was then turned off and the temperature therein was allowed to recede to 80 degrees C. The hydrogen and oxygen were then turned off, the oven was opened and the part was allowed to cool to room temperature in the ambient air. The finished part was observed and found to replicate the "green" part originally placed in the oven in shape. The part was measured and found to have shrunk isotropically by 20 per cent. The part appeared uniformly shiney on its exterior surface. Measurement indicated that the part had a density which was 93% of the theoretical density for pure nickel.

While the preferred embodiment utilized pure nickel, it is readily apparent that other metals, taken singly or in combination, as well as powdered prealloys can be used in place of the nickel with processing temperatures being adjusted for the materials involved during the sintering process as is well known in the art.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:

1. A method of forming an art medium comprising the steps of:

(a) providing a homogeneous mixture of from about 91% to about 97% by weight of sinterable powdered metal having an average particle size of up to about 5 microns and from about 9% to about 3% by weight of a plasticizer;

(b) mixing said mixture of (a) with water, and (c) storing the mixture of (b) in an air tight enclosure for from about one week to about one month.

2. The method of claim 1 wherein said powdered metal is selected from the group consisting of powdered alloys, powdered metals and mixtures of plural individual powdered metals.

3. The method of claim 1 wherein said plasticizer is a ceramic material.

4. The method of claim 2 wherein said plasticizer is a ceramic material.

5. The method of claim 3 wherein said ceramic is bentonite.

6. The method of claim 4 wherein said ceramic is bentonite.

7. The method of claim 1 wherein said sinterable powdered metal is nickel.

8. The method of claim 6 wherein said sinterable powdered metal is nickel.

9. A method as set forth in claim 1 further including the step of molding said mixture of (c) into a predetermined shape.

10. A method as set forth in claim 8 further including the step of molding said mixture of (c) into a predetermined shape.

11. A method of forming an art medium comprising the steps of:

(a) providing a homogeneous mixture of from about 91% to about 97% by weight of sinterable powdered metal and from about 9% to about 3% by weight of a plasticizer;

(b) mixing said mixture of (a) with water, and (c) storing the mixture of (b) in an air tight enclosure for from about one week to about one month.

12. The method of claim 11 wherein said sinterable powdered metal is nickel.

* * * * *